Figure 1:
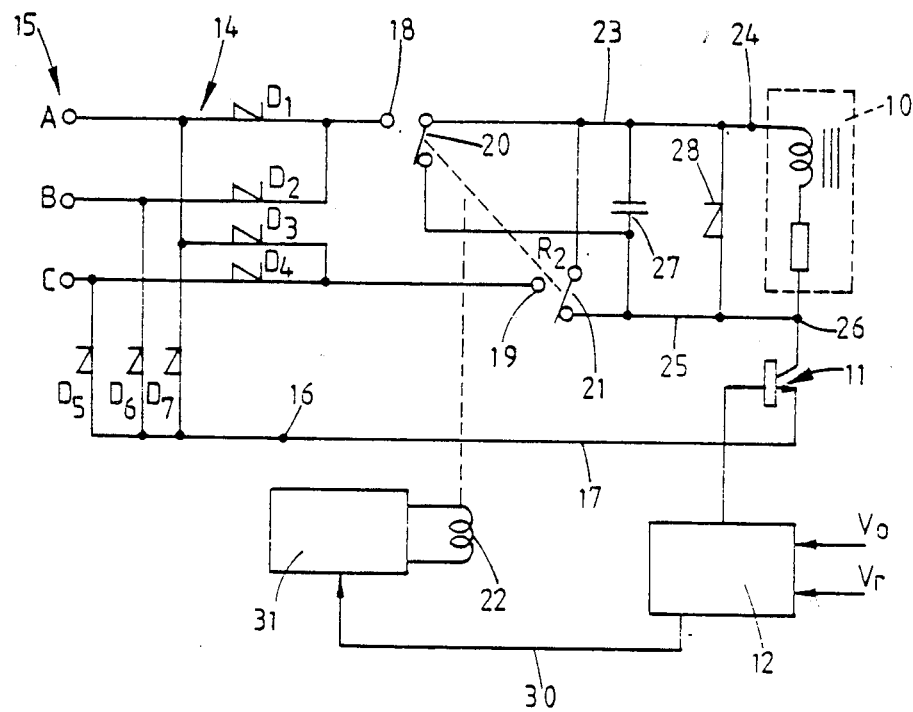

United States Patent [19]

Smith

[11] Patent Number: 4,706,179

[45] Date of Patent: Nov. 10, 1987

[54] ARRANGEMENT FOR SWITCHING RECTIFIED ALTERNATING CURRENT

[75] Inventor: Sidney B. Smith, Hemel Hempstead, England

[73] Assignee: Lucas Industries Plc, Birmingham, England

[21] Appl. No.: 911,973

[22] Filed: Sep. 25, 1986

[30] Foreign Application Priority Data

Nov. 19, 1985 [GB] United Kingdom ............... 8528501

[51] Int. Cl.⁴ .............................................. H02M 7/06
[52] U.S. Cl. ........................................ 363/126; 363/89
[58] Field of Search .................... 363/3, 4, 125–129, 363/53, 89

[56] References Cited

U.S. PATENT DOCUMENTS

| | | | |
|---|---|---|---|
| 3,760,255 | 9/1973 | Grodinsky | 363/127 X |
| 4,330,818 | 5/1982 | Peschel | 363/126 |
| 4,471,423 | 9/1984 | Hase | 363/126 X |
| 4,555,753 | 11/1985 | Takahashi | 363/126 |

Primary Examiner—Patrick R. Salce
Assistant Examiner—Marc J. Hoff
Attorney, Agent, or Firm—Trexler, Bushnell, Giangiorgi & Blackstone, Ltd.

[57] ABSTRACT

A rectifier has a d.c. return terminal and two d.c. output terminals. The elements of the rectifier are connected so that d.c. currents through the output terminals are discontinuous and that the sum of these currents is continuous d.c. output. Switches are provided to connect the d.c. output terminals to a common supply terminal for a load, or to isolate the output termnals from each other and from the load.

5 Claims, 6 Drawing Figures

ARRANGEMENT FOR SWITCHING RECTIFIED ALTERNATING CURRENT

Switching of direct current by mechanical devices commonly gives rise to arcing at the switch contacts, particularly where the direct current is applied to an inductive load. Additionally, where complete physical isolation of a load from its supply is required it may be undesirable to use solid state switching devices. Because of the aforesaid arcing problems mechanical switches are normally required to have considerable size and weight and this is undesirable in any circumstances. In particular, switching of rectified three-phase alternating current in aircraft electrical systems requires the switching devices to be as small as possible.

The present invention relates to a circuit arrangement by means of which rectified alternating current may be switched by devices which are substantially smaller than those hitherto considered necessary.

According to the invention there is provided an arrangement for switching rectified alternating current, comprising a rectifier arrangement having input terminals for an a.c. input, a first d.c. terminal for a return direct current, and second and third d.c. terminals, said rectifier arrangement including rectifier elements connected so that first and second currents flowing through said second and third terminals respectively are discontinuous and that the sum of said first and second currents can provide a substantially continuous rectified output, and switch means operable between a first state in which said second and third terminals are commonly connected to a supply terminal for a load, and a second state in which said second and third terminals are isolated from each other and from said supply terminal.

Figure 2:
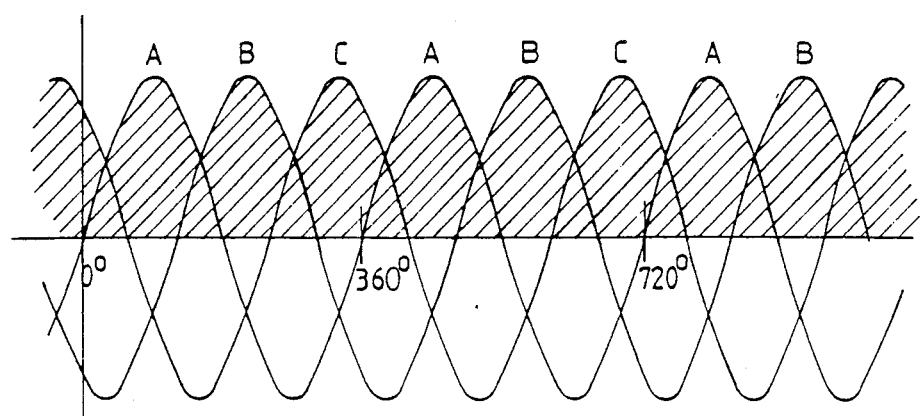
Figure 2:
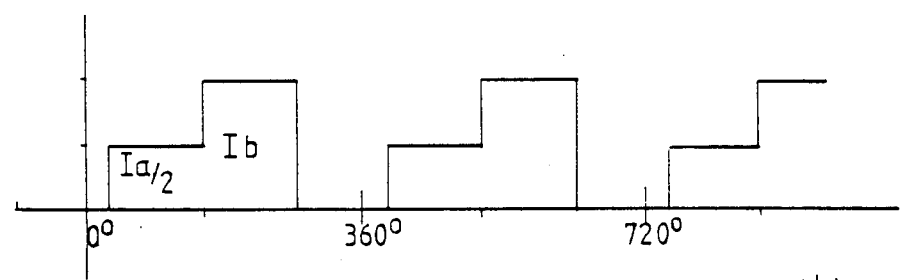
Figure 2:
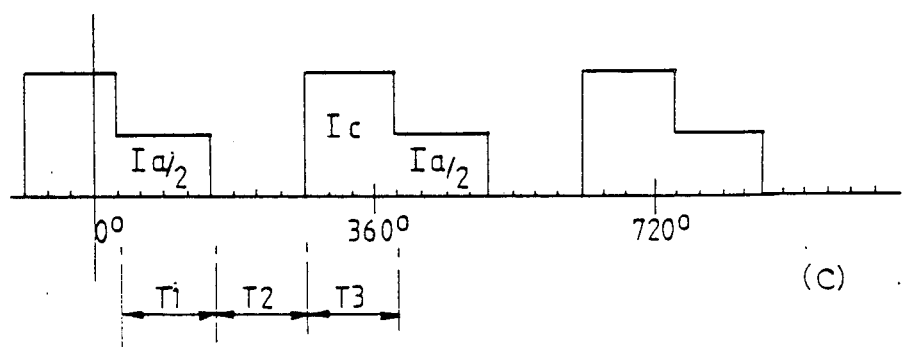
Figure 3:
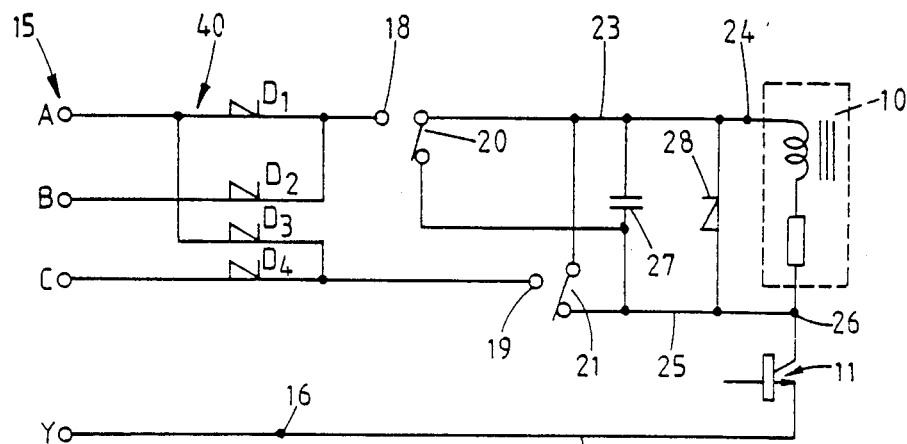
Figure 4:
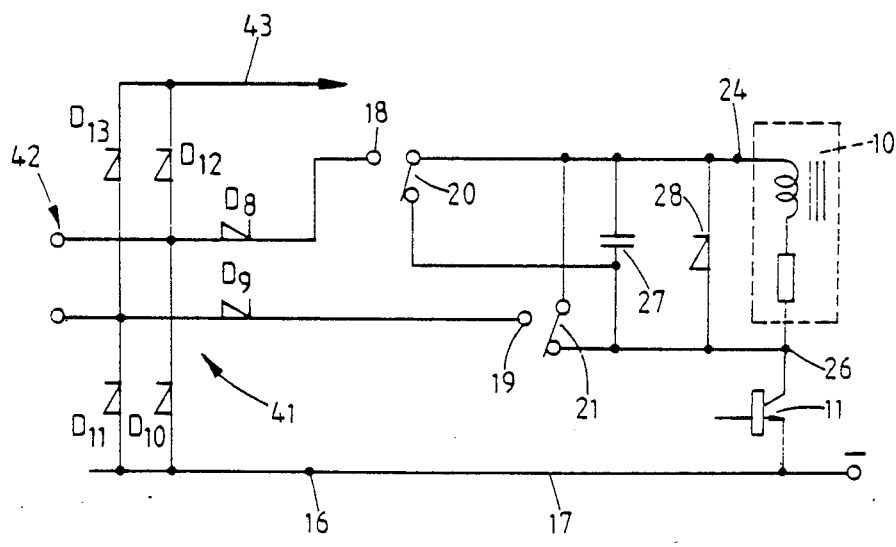
Figure 5:
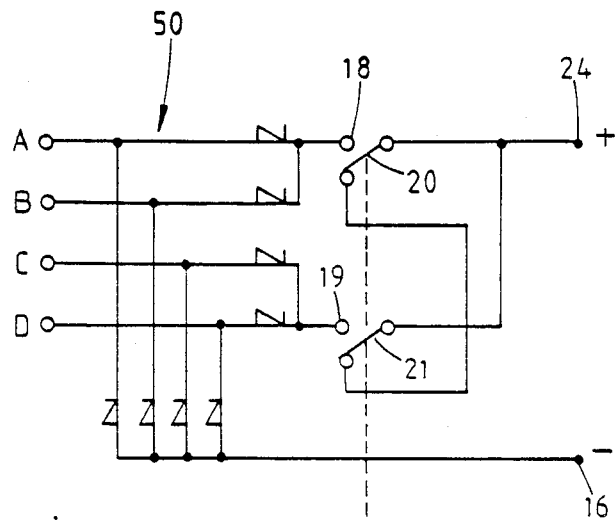
Figure 6:
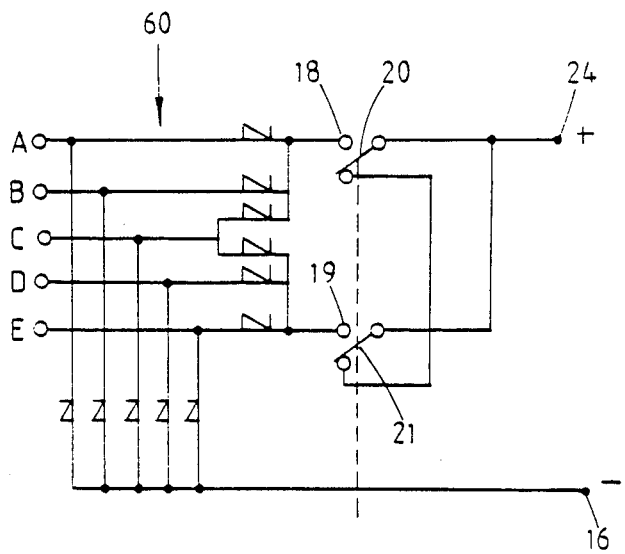

Embodiments of the invention will now be described by way of example only and with reference to the accompanying drawings in which:

FIG. 1 shows an arrangement for switching full wave rectified three phase alternating current, FIG. 2 shows the a.c. input voltages and the corresponding direct currents at the outputs of the rectifier in FIG. 1, FIG. 3 shows a modified arrangement for switching half-wave rectified three-phase alternating current, FIG. 4 shows a further modification for switching full wave rectified single phase alternating current, FIG. 5 shows part of an arrangement for switching full wave rectified four-phase alternating current, and FIG. 6 shows part of an arrangement for switching full-wave rectified five phase alternating current.

FIG. 1 shows an example of the arrangement when used for d.c. supply to a field winding 10 of a brushless electric generator of a type commonly used for aircraft power supplies. Such a generator is shown and described in U.S. Pat. No. 2,525,495 and includes a pilot exciter alternator which has a three-phase output, this output being rectified and used to energise the field winding 10 which forms part of a main exciter alternator. The output of the main exciter alternator is regulated by providing that energising current through the field winding 10 is switched by a solid state device 11 controlled by a pulse-width modulating circuit 12. The circuit 12 is of a known type which forms no part of the present invention and is responsive to a reference voltage Vr and to the output voltage Vo of the generator, to maintain the voltage Vo at a desired level.

A full wave rectifier 14 has input terminals 15 to which the respective phases A, B, C of the exciter alternator output are applied. A first d.c. terminal 16 of the rectifier 14 is connected to a common d.c. return line 17. A second d.c. terminal 18 of the rectifier 14 is connected to the A phase terminal through a diode D1 and to the terminal 16 through a diode D7. The terminal 18 is also connected to the B phase terminal through a diode D2 and to the terminal 16 through a diode D6. Thus far the rectifier 14 corresponds to known three phase full wave rectifiers. The rectifier 14 of the present invention differs in that there is a third d.c. terminal 19 connected to the C phase terminal through a diode D4 and to the terminal 16 through a diode D5. The terminal 19 is also connected to the A phase terminal through a diode D3.

Terminals 18, 19 provide respective contacts of ganged switches 20, 21 operable by a solenoid 22. In the unoperated condition of the solenoid 22 the terminals 18, 19 are connected through a line 23 to a terminal 24 for the winding 10. In the operated condition (shown) of the solenoid 22 the terminals 18, 19 are isolated from the line 23 which is then connected through a line 25 to the other terminal 26 of the winding 10. The terminal 26 is connected through the solid state device 11 and the line 17 to the terminal 16.

A capacitor 27 and a diode 28 are connected in parallel with each other and in parallel with the winding 10. The capacitor 27 acts to smooth any voltage spikes which occur as the device 11 assumes an open circuit condition, at which times the energy stored in the winding 10 may also be shorted through the diode 28.

In normal use the solenoid 22 is energised so that both the terminals 18 and 19 are connected to the line 23. FIG. 2a shows the three phases of the alternating input voltage at the terminals 15 and FIGS. 2b and 2c show the magnitudes and relative phases of the rectified currents at the terminals 18, 19 respectively, the substantially rectangular form of these currents arising from the high inductance of the winding 10. It will be seen that over time T1 a current Ia from phase A of the voltage supply is divided between the terminals 18, 19. Over time T2 a current Ib from the voltage phase B flows through terminal 18 only, and over time T3 a current Ic from the voltage phase C flows through terminal 19 only. The sum of the currents at terminals 18, 19 is a substantially constant direct current, so long as the device 11 is conducting. The current in line 23 is switched by the device 11 in accordance with a difference between the voltages Vo and Vr, as described above. The use of a semi-conductor device 11 is satisfactory for this purpose since it is not required to provide total physical isolation between the field winding 10 and the terminal 16. Malfunction of the device 11 or circuit 12 can be such as to render the device 11 permanently conductive. An earth fault may also occur on the line 25. In either case the winding 10 is permanently energised and the output of the generator as a whole may be excessively high. Any such malfunction is detected by the circuit 12 which applies a signal on a line 30 to a control circuit 31 for the solenoid 22, de-energising the latter and causing the switches 20, 21 to move to the position shown in FIG. 1. Since the switches 20, 21 are carrying currents as shown in FIGS. 2b and 2c respectively, these switches are therefore switching discontinuous currents and arcing is substantially reduced.

FIG. 3 shows part of an alternative embodiment to that shown in FIG. 1, corresponding parts having identical reference numerals. The embodiment of FIG. 3 has a rectifier 40 having diodes D1, D2, D3 and D4 connected in the same way as the corresponding diodes in FIG. 1, but diode connections between the terminals 16 and the terminals of the phases A, B, C are absent.

The arrangement shown in FIG. 4 has a full wave rectifier arrangement 41 having diodes D8 and D9 connected between respective ones of input terminals 42 for the alternating supply and respective ones of the terminals 18, 19. The terminal 16 is connected to the respective input terminals through diodes D10 and D11. Additional diodes D12, D13 provide rectified current on a line 43 to control circuits, for example the control circuits 12, 31 of FIG. 1, which are connected between lines 43 and 17 and which do not include high inductive loads and which may therefore be switched by semiconductor devices.

FIG. 5 shows the switches 20, 21 are combined with a rectifier arrangement 50 which is responsive to four phases A, B, C, D of alternating current to provide full-wave rectified d.c. between the terminals 16, 24. It will be seen that currents flowing through terminals 18, 19 are derived from the voltages of phases A, B and phases C, D respectively.

FIG. 6 shows the switches 20, 21 combined with a rectifier arrangement 60 which is responsive to five phases A, B, C, D, E of alternating current to provide full-wave rectified d.c. between the terminals 16, 24. It will be seen that this arrangement corresponds in principle to that of FIGS. 1 and 3, that is that for an odd number of phases n, when n is three or more, the currents at the terminals 18, 19 are each derived from $(n-1)/2+1$ of the input phases, the added one phase being the same for both currents, i.e. phase A in FIGS. 1 and 3, and phase C in FIG. 5.

It will also be seen that in FIG. 5 the currents through terminals 18, 19 are derived from respective halves, A+B and C+D of the total number of input phases.

In the case of a single phase input, as shown in FIG. 4, the currents at terminals 18, 19 are derived from respective positive-going and negative-going half-phases of the input voltage.

It will also be seen that in each embodiment the rectifier arrangement has, in addition to a terminal for return direct current, two terminals 18, 19 through which discontinuous direct currents flow, so that the switches 20, 21 are not required to break continuous direct current, and arcing problems are reduced, enabling the use of smaller switch parts than would otherwise be required. In each of the described embodiments the rectifier arrangement has, in addition to a terminal for return direct current, two terminals 18, 19 to which the diodes in the rectifiers are connected so that the currents at the terminals 18, 19 are evenly divided in magnitude and phase so that the sum of these currents can be a continuous rectified output.

In alternative embodiments in which the number of input phases is odd and is three or more, the diodes of the rectifer arrangement may be connected so that the currents at the terminals 18, 19 are not evenly divided, provided that the switches 20, 21 will always break discontinuous currents. The latter requirement may be achieved by arranging the rectifier diodes so that the currents at the respective terminals 18, 19 are derived only from consecutive phases of the input, for example from phases A, B, C and phases D and E respectively in FIG. 6.

I claim:

1. An arrangement for switching rectified alternating current, comprising a rectifier arrangement having input terminals for an a.c. input and first and second terminals for direct current, said rectifier arrangement has a third direct current terminal and comprises rectifier elements connected so that first and second currents flowing through said second and third terminals respectively are discontinuous and that the sum of said first and second currents can provide a substantially continuous rectified output, and switch means operable between a first state in which said second and third terminals are commonly connected to a supply terminal for a load and a second state in which said second and third terminals are isolated from each other and from said supply terminal.

2. An arrangement as claimed in claim 1 in which said switch means provides a shunt for said load when operated in said second state.

3. An arrangement as claimed in claim 1 or claim 2 in which the number of phases of said a.c. input is odd and not less than three, the currents flowing through each of said second and third terminals being derived from $1+(n-1)/2$ of the phases of said input, only one of said input phases being used to derive both input currents.

4. An arrangement as claimed in claim 1 or claim 2 in which the number of said phases is even and the currents flowing through said second and third terminals are derived from respective halves of said number of phases.

5. An arrangement as claimed in claim 1 or claim 2 in which said a.c. input is single phase and the currents flowing through said second and third terminals are derived from respective positive-going and negative-going half waves of said a.c. input.

* * * * *